Nov. 17, 1959 W. A. SCHMALL 2,912,922
SHUTTER MECHANISM FOR COMBINATION COOKING APPLIANCE
Filed July 17, 1956 2 Sheets-Sheet 1
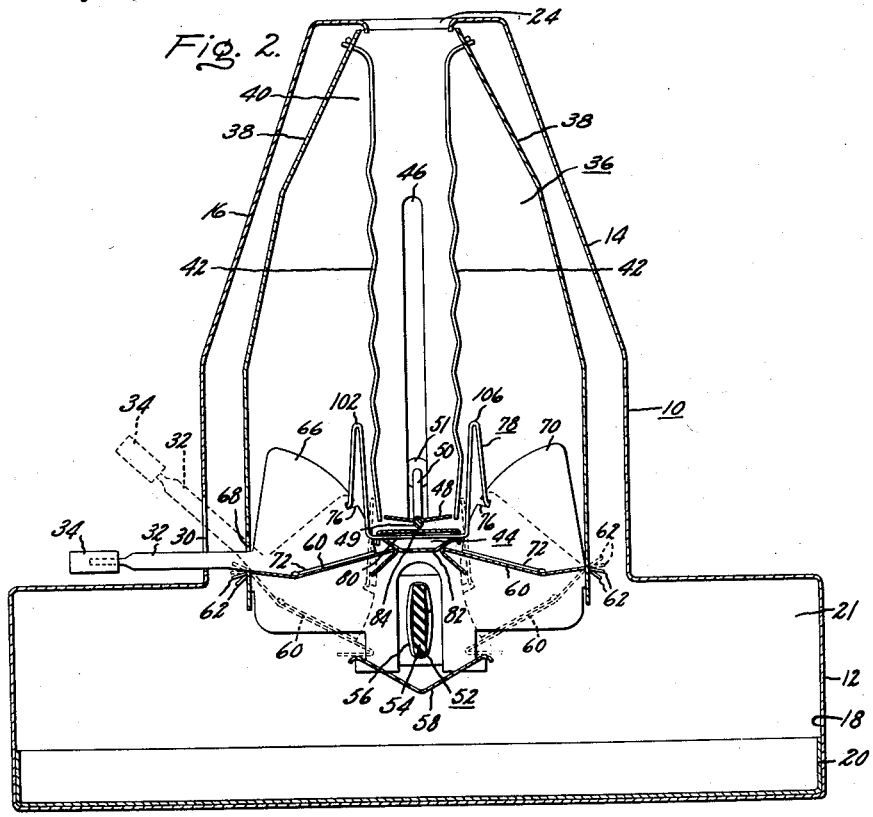
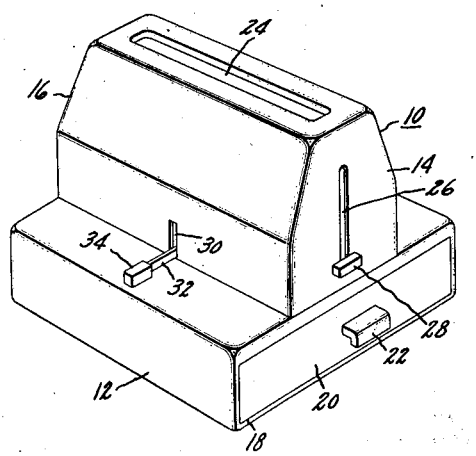
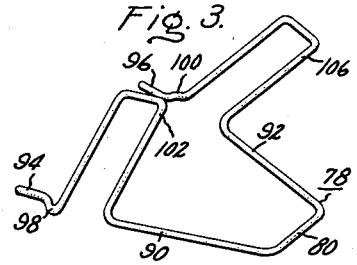
Inventor:
Wilbur A. Schmall,
by Armand Cifelli
His Attorney.

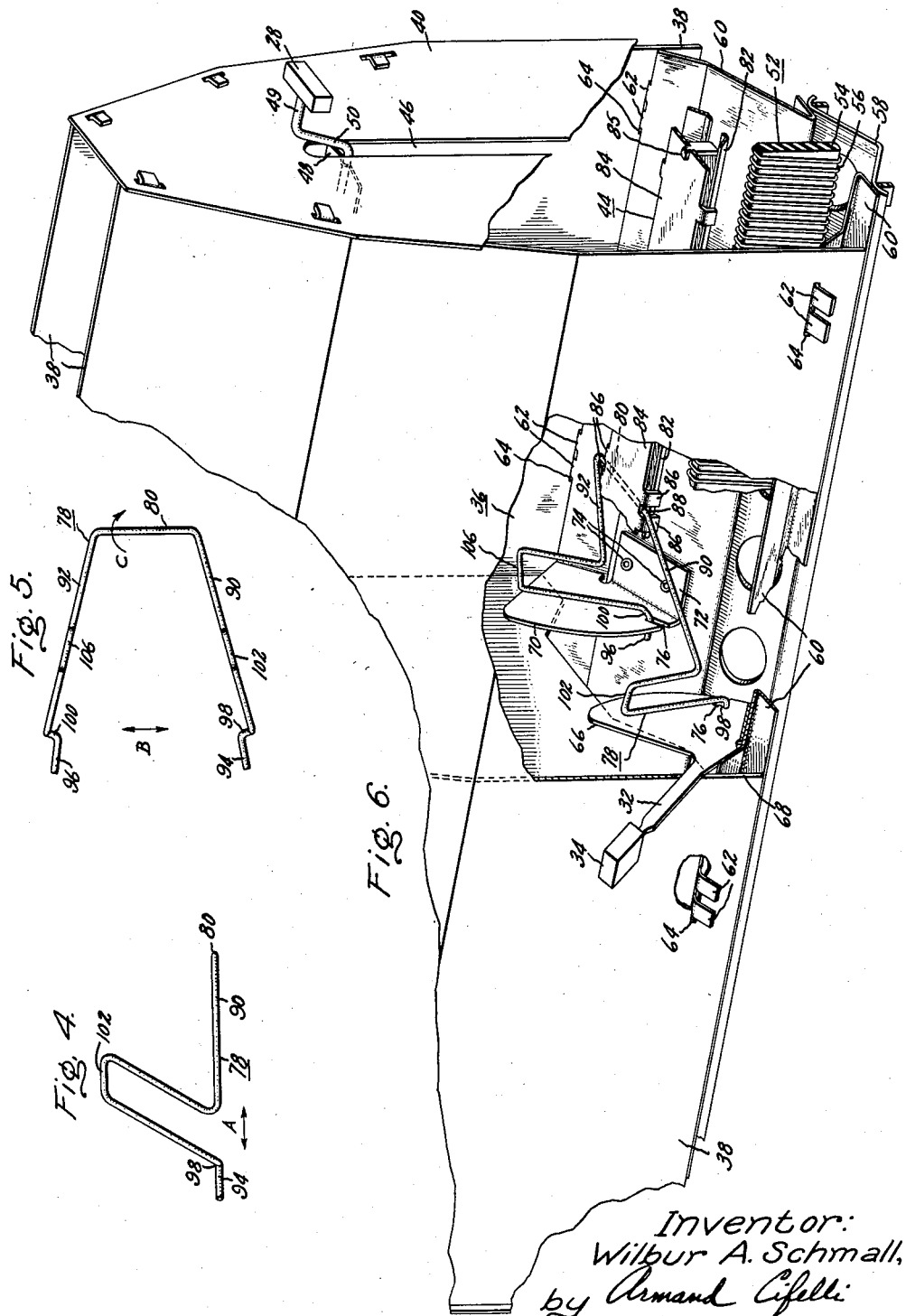

United States Patent Office 2,912,922
Patented Nov. 17, 1959

2,912,922

SHUTTER MECHANISM FOR COMBINATION COOKING APPLIANCE

Wilbur A. Schmall, Allentown, Pa., assignor to General Electric Company, a corporation of New York Application July 17, 1956, Serial No. 598,393

11 Claims. (Cl. 99—340)

This invention relates to cooking appliances, and particularly to those of the type having two cooking spaces, a single heating means, and an arrangement for selectively directing the heat emitted from the heating means to either of the spaces.

The cooking appliance art has and is expending much energy and effort to the end of providing multi-purpose, cooking appliances. In my pending patent application, Serial No. 474,137, filed December 9, 1954, and assigned to the assignee of the instant application, now Patent No. 2,862,441, issued on December 2, 1958 there is disclosed and claimed inter alia, a multi-purpose, toaster-oven appliance which includes a toasting space, an oven space, a single heating means, and movable flaps with associated parts for selectively directing the heat which is emitted from the heating means to either of the spaces. The term "shutters" is used throughout this patent application in lieu of the term "flaps," which was used throughout my referred-to pending, patent application. The construction, assembly and operation of the shutters and their associated parts in such a multi-purpose, cooking appliance present several problems. These problems are accentuated, because the shutters and their associated parts are relatively inaccessible. Among these problems are the following: For convenience, economy, and operational efficiency, it is desirable to have both shutters move simultaneously when changing their positions. In order to produce uniform distribution of the heat emitted from the heating means, it is important that the shutters be accurately located in all positions that they may assume during operation of the appliance. Lastly, the problem of simplifying the construction and assembly costs of these elements of the appliance is most important and ever present in the highly competitive appliance arts.

It is an object of this invention to provide in a multi-purpose, cooking appliance, an improved arrangement for directing heat emitted from a single heating means to either one of two cooking spaces in the appliance; the improvement which it is desired to effect resides in simplifying the construction and assembly of the arrangement, improving its operational efficiency, and reducing its over-all cost.

The object of the invention is achieved in one form by providing in a multi-purpose, cooking appliance, two communicating cooking spaces, a single heating means located in the area where the cooking spaces communicate, a pair of shutters which are adapted to direct heat emitted from the heating means to either of the spaces depending upon the position of the shutters, and a shutter spring which is operatively connected to both of the shutters and is constructed and mounted to assist in assembling and accurately positioning the shutters in the appliance and to provide an arrangement wherein simultaneous movement of both shutters is affected when one of the shutters is moved, as by actuation of a control lever which is connected to one of the shutters and is accessible from the exterior of the appliance.

Other objects and further details of that which I believe to be novel and my invention will be clear from the following description and claims taken with the accompanying drawings wherein:

Fig. 1 is a perspective view of a combination cooking appliance of the toaster-oven type covered by my referred-to, pending, patent application, but modified to include the improved shutter mechanism;

Fig. 2 is a sectional view of the Fig. 1 appliance taken transversely and centrally thereof;

Fig. 3 is a perspective view of the shutter spring;

Fig. 4 is a side elevation view of the shutter spring;

Fig. 5 is a top elevation view of the shutter spring, and

Fig. 6 is a fragmentary, perspective view of the toasting chamber portion of the appliance.

The combination cooking appliance is designated in the drawings generally by reference numeral 10, and comprises a lower, oven portion 12, and an upper, toaster portion 14. The appliance is formed by an outer housing 16 which is shaped to provide the oven and toaster portions mentioned, and to house the internal structure of the appliance.

The oven portion 12 has an opening 18 formed in it at one side, which is adapted to allow insertion and removal of an oven drawer 20 into and out of the oven space 21 defined by the oven portion. Oven drawer 20 has a handle 22 which is manually grippable to facilitate movement of the oven drawer.

The toaster portion 14 includes a generally horizontal slot 24 in its top wall to allow the insertion and withdrawal of bread slices into the toasting space defined by the toasting portion. The toasting portion also includes a generally vertical slot 26 in one of its end walls, through which a bread rack control rod, which is connected to a bread rack that is located within the toasting space, extends and is slidably mounted within. A manually grippable, bread rack control knob 28 is attached to the free end of the control rod. The bread rack is vertically movable in the toasting space and may be manually raised and lowered by gripping control knob 28. A side wall of the toaster portion 14 has a vertical slot 30 formed therein, through which a shutter control lever 32 extends, and which at its free end has a manually grippable, shutter control knob 34 secured.

By reference to Fig. 2 the interior of the appliance and its internal structure can be seen. Within the toaster portion 14 there is located a toasting space 36, which will be referred to as a toasting chamber, and which is formed by bent, side reflectors 38 which oppose each other in the manner illustrated, and end reflectors 40, one of which is illustrated in Fig. 2, and the other of which is illustrated in Fig. 6. The manner in which the end reflectors are connected to the side reflectors may be seen in Fig. 6 as being a conventional tab and slot connection. The reflectors are rigidly connected to the housing 16 in any conventional manner. These connections have not been illustrated, because the particular manner of effecting them forms no specific part of my invention. The oven space 21, which will hereinafter be referred to as the oven chamber, communicates with the toasting chamber throughout a substantial area in the vicinity of the lower extremities of the reflectors.

Within the toasting chamber 36 are mounted bread slice guide wires 42 which are connected at their upper ends to upper portions of the side reflectors 38, and which depend into the toasting chamber and are connected at their lower ends to a generally horizontally extending, elongated, bread guard 44 which is disposed in the area where the chambers communicate as by being connected at its ends to the end reflectors 40 (this is not clearly shown in any of the figures, but this may be effected by conventional connections). The end reflectors 40 each has a vertically extending slot 46.

A bread rack 48 is mounted for vertical movement within the space formed by the guide wires 42 above the bread guard 44. The bread rack has a control rod 49 which has offset portions 50 at its ends which extend through the slots 46, one of which portions has an enlarged washer 51 secured at its end, and the other of which portions extends through the slot 26 in the housing 16 (see Fig. 1) and has the control knob 28 mounted at its free end. It will be understood that the mounting of the bread rack 48 is such that it is adapted to support a bread slice and to be manually raised or lowered at will within the limits of the slots 46 by gripping and moving the control knob 28. Of course, automatic arrangements for raising or lowering the bread rack could be provided, but for the purposes of the instant invention such arrangements are not necessary.

Extending below and generally parallel to the bread guard 44 is an elongated heater 52 which is connected at its ends to lower portions of the end reflectors 40 in any conventional manner. The heater 52 comprises an insulating rod 54 having electrical resistance wire 56 wrapped around it. It will be understood that appropriate electrical connections will be provided and that appropriate timing and/or switch controls may also be provided to control energization of the heater in accordance with known techniques. The details of these components form no specific part of this invention, it solely being necessary that the heater 52 emit heat generally in all directions when it is energized.

Below heater 52 there is disposed a perforate, V-shaped, oven guard 58. Guard 58 extends generally parallel to and is spaced below the heater 52, and is connected at its ends to lower portions of the end reflector 40 in any conventional manner. The arrangement described thus far is such that the heater 52 extends generally horizontally between the end reflectors 40, spaced above and parallel to the heater 52 is the bread guard 44, and spaced below and generally parallel to the heater 52 is the oven guard 58. All these elements are mounted in fixed position between the end reflectors 40 in the general area where the chambers communicate; when energized the heater emits heat in all directions, and the guards function to prevent radiation of heat directly upwardly and to reduce the amount of heat radiated downwardly.

A shutter mechanism is provided which will enable the heat emitted from the heater 52 to be selectively directed to either the toasting chamber 36 or the oven chamber 21, to respectively either toast bread slices placed on the bread rack 48 or broil, toast or warm food objects placed in the oven drawer 20. The shutter mechanism comprises a pair of shutters in the form of elongated, bent, flat sheets 60 that are located in the area where the chambers communicate, and associated parts for moving and positioning the shutters.

In Fig. 2, the shutters 60 are illustrated in solid lines in their oven position, that is, in position to direct heat emitted from the heater 52 downwardly into the oven chamber 21. In dotted lines in Fig. 2, and in solid lines in Fig. 6, the shutters 60 are illustrated as disposed in toasting position, that is, in position to direct heat emitted from the heater 52 upwardly into the toasting chamber 36.

The shutters 60 are pivotally mounted to lower portions of the side reflectors 38 as by having tabs 62 on the shutters which extend through slots 64 in the side reflectors; the tabs 62 may be bent on the outer sides of the side reflectors 38 if desired. It will be understood that as described thus far, the tab and slot connections between the shutters 60 and side reflectors 38 are such that they allow unrestrained movement of the shutters including pivotal movement between the upper and lower positions illustrated in Fig. 2, the oven and toasting positions, respectively. In their upper position, the solid line position in Fig. 2, the shutters contact lower portions of the bread guard 44, which in effect constitutes an upper stop for the shutters, and in their lower position, the dotted line position in Fig. 2, the shutters contact upper portions of the oven guard 58, which in effect constitutes a lower stop for the shutters.

In all of their positions, the shutters are urged against the side reflectors into assembled relation and their movement is controlled by the shutter spring 78, as will become apparent. Each of the shutters 60 has a pie-shaped shield connected to it centrally of its length on its upper side. The left-hand shield in Fig. 2 is designated 66 and is illustrated as having the shutter control lever 32 connected thereto which extends through the slot 68 in one of the side relectors 38, and the slot 30 in the housing 16 (see Figs. 1 and 2). The other shield 70 does not have a lever connected to it. Both of the shields are mounted in planes that are normal to the planes of their associated shutters, and each has a flange 72 by means of which it is connected to its associated shutter as by rivets 74. Each of the shields 66 and 70 has a notch 76 formed therein and the notches are located to generally oppose each other.

Pivotally secured to the bread guard 44 and connected to each of the shields 66 and 70 is the shutter spring 78. The details of construction and operation of the shutter spring 78 will be described subsequently. For the present, however, it is important to note that it has a central portion 80 (see Figs. 3 and 6) which is received between the two elongated plates 82 and 84 which form the bread guard 44. In Fig. 6 it will be seen that the members 82 and 84 are connected to each other by a plurality of bent tabs 85 (only one is illustrated) which are formed out of plate 82 and pass through openings in plate 84, and that at a central point, a pair of tabs 86 is disposed on each side of the bread guard, and they cooperate to provide a space 88 through which the central portion 80 of the shutter spring 78 extends; the connection is such as to allow pivotal movement of the shutter spring 78 relative to the bread guard 44 about an axis that passes through the central portion 80 and which is transverse to the bread guard.

The shutter spring 78 has a pair, 90 and 92, of legs which extend away from its central portion 80. As can be seen in Fig. 5, when viewed from above, the shutter spring generally forms a U, the legs of which diverge away from the central portion, and a pair of offset ends, 94 and 96, which are connected to the main portions of their respective legs by the bent portions 98 and 100. When viewed in side elevation (see Fig. 4), it will be seen that the leg 90 has an upwardly extending U-shaped bend 102 formed immediately adjacent the bent portion 98. From Fig. 3 it will be apparent that the leg 92 has a similar U-shaped bend 106 formed therein immediately adjacent the bent portion 100.

While it is difficult to describe the precise configuration of the shutter spring 78 in words, it is believed that from an inspection of Figs. 3, 4 and 5, and the foregoing description, an understanding of its configuration when in its free state prior to assembly will be clear. The configuration of the shutter spring is such that it produces a relatively low spring gradient in the directions A and B in Figs. 4 and 5, respectively, but a high spring gradient in direction C (in torsion) in Fig. 5.

It will be understood that when the shutter spring is mounted, as illustrated in Figs. 2 and 6, within the appliance, the central portion 80 is pivotally received and supported by the bread guard 44 in the space 88, and that the ends 94 and 96 are each received in one of the notches 76 in the shutter shields 66 and 70, respectively. It is necessary to deform the shutter spring 78 from its free state configuration shown in Figs. 3, 4 and 5 to effect this mounting. When fully mounted and the shutter shields are disposed to locate the shutters in their upper position (solid lines in Fig. 2), the shutter spring 78 appears as it is illustrated in solid lines in Fig. 2. When the shutter shields are located so as to dispose the shutters in their lower position (dotted lines in Fig. 2 and solid lines in Fig. 6), the spring is disposed as can best be seen in Fig. 6.

To adjust the shutters from one position to the other, shutter control knob 34 is grasped and is moved either up or down. This effects movement of the shutter control lever 32 which is transmitted to the shutter shield 66 and its associated shutter 60. The force is transmitted through the shutter spring 78 to the other shutter shield 70, and results in the other shutter 60 being moved simultaneously with the first shutter. The high torsional spring gradient of the spring facilitates this simultaneous movement.

During movement from one position to the other, the central portion 80 of the shutter spring pivots and the U-shaped bends 102 and 106 are compressed to allow the portions of the spring ends that are adjacent the shields to move in generally vertical lines rather than arcuate ones, which they would follow if unrestrained; due to the restraining action of the shields, the spring ends cannot follow arcuate lines, hence, the U-shaped bends are compressed. Because of the action of the U-shaped bends, an over-center snap action is effected when the lever is pivoted in either direction. The shutter spring is so designed that in either of its extreme positions, the U-shaped bends are compressed slightly, thereby forcing the shutters against the involved stop (either the bread guard 44 or the oven guard 58). Also, because of the necessity of compressing the shutter spring legs laterally toward each other when mounting the spring, they function to exert lateral forces against the shutter shields 66 and 70, and thereby assist in retaining them and their associated shutters in position. It will be understood that both compression of the U-shaped bends and lateral compressing of the legs is facilitated by the low spring gradient in each of the involved directions.

A shutter mechanism has been provided which is simple in construction and assembly, hence in cost; and which has a shutter spring that exerts lateral forces against the shutter shields to assist in accurately maintaining the shutters in assembled relation to the side reflectors and in position, thereby insuring proper distribution of heat emitted from the heater, which operates with over-center, snap action when the shutters' position is changed to force the shutters against either the upper or lower stop, and which effects simultaneous movement of both shutters when one of the shutters is moved. Therefore, the disclosed shutter mechanism satisfies the objects of this invention.

As will be evident from the foregoing description, certain aspects of my invention are not limited to the particular details of construction of the example illustrated, and I comtemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. In a cooking appliance, a pair of cooking spaces, said spaces being in communication with each other, a heater in the vicinity of where said spaces communicate for producing heat, and means for selectively directing the heat to either of the spaces, said means comprising a pair of spaced shutters and a shutter spring mounted therebetween, said shutters being in the form of elongated plates which are pivotal, respectively, on an axis passing generally through one of their edges between one position wherein they direct the heat to one of said spaces and another position wherein they direct the heat to the other of said spaces, said shutter spring being operatively connected to both of said shutters in such a manner that pivoted movement of one of the shutters results in substantially simultaneous pivotal movement of the other shutter.

2. A device as defined in claim 1 wherein said positions are fixed by stops, and said shutter spring operates with over-center, snap action during movement of said shutters from either position to the other, whereby said shutter spring urges said shutters against the stop which fixes the position to which the shutters have been moved.

3. A device as defined in claim 1 wherein said appliance includes walls which pivotally support said shutters, and said shutter spring is stressed when operatively connected to said shutters, whereby said shutters are urged against said walls and thereby retained in proper assembled relation by said shutter spring.

4. A device as defined in claim 1 wherein each of said shutters has a shield to which said shutter spring is connected, and one of said shields has a lever which extends to the exterior of said appliance, whereby movement of said lever results in substantially simultaneous movement of both of said shutters.

5. A device as defined in claim 1 wherein said shutter spring has a central portion which is pivotally supported and a pair of legs which are operatively connected at their free ends to said shutters.

6. A device as defined in claim 5 wherein each of said legs has a bend which renders the legs resilient in a longitudinal direction.

7. A device as defined in claim 1 wherein said shutter spring is an elongated wire which is bent into a generally U-shape, the bight of the U is pivotally supported, the legs of the U are flexible and operatively connected at their free ends to said shutters, and each of said legs has a generally U-shaped bend which renders the legs resilient in a longitudinal direction, the dimensional relation between the spring and the remainder of its associated appliance parts being such that the spring is stressed when mounted, whereby the spring urges said shutters away from each other and into the position in which they are located, and wherein during movement of the shutters from one position to the other, the spring deforms and operates with over-center, snap action and thereby urges said shutters to the other position when moved to the latter position.

8. The combination of a pair of plates adapted to lie in a common plane, said plates having adjacent edges which are parallel and spaced, and far edges which are parallel and spaced apart farther, said plates being pivotal about their far edges on spaced axes between two positions, a spring operatively connected to said plates, said spring being U-shaped and having a bight portion and a pair of legs which diverge away from said bight portion, each of said legs being resilient in the direction of its length, said bight portion being pivotally supported on an axis which is normal to the axes of said plates, said legs being operatively connected to said plates near their adjacent edges, said spring being under stress when operatively connected to said plates, whereby said plates are normally urged away from each other and into one or the other positions, and said spring operates with over-center, snap action when the plates are moved from one position to the other, and thereby urges said plates to the other position when they are moved to said other position.

9. The combination defined in claim 8 wherein said spring comprises a bent, elongated wire, said wire being generally U-shaped and comprising a central bight portion and a pair of legs, each of said legs having a U-shaped bend, said bight portion and the portions of said legs other than said bends lying substantially in a common plane, and said bends extending in planes that are generally normal to said common plane.

10. The combination defined in claim 9 wherein said spring has a low spring gradient in the direction of movement of said pair of legs toward and away from each other, and in the direction of movement of the legs of the U-shaped bends toward and away from each other, and wherein said central bight portion has a high spring gradient in the direction of torsional stress.

11. In a cooking appliance, a pair of cooking chambers, an elongated opening placing said chambers into communication with each other, a heater in said opening for producing heat, a pair of elongated shutters adapted to pivot on axes which are parallel to said opening and pass through the far edges of said shutters, between a first position in which they substantially close said opening to complete one of said chambers with the heater therein, whereby the heat is directed into said one chamber, and a second position in which they substantially close said opening to complete the other chamber with the heater positioned therein, whereby the heat is directed into said other chamber, said shutters having upstanding portions, one of said upstanding portions having a lever that extends to the exterior of the appliance, a shutter spring operatively connected to said shutters, said spring being generally U-shaped, having a bight portion and a pair of diverging legs, said bight portion being pivotally supported on an axis which is normal to said axes, the free ends of said legs being connected to said upstanding portions, each of said legs having a U-shaped bend therein, said spring being deformed when mounted so as to be under stress in the longitudinal direction of each of said legs and in the transverse direction of said legs, whereby said spring functions to urge said shutters apart and into one or the other positions, and to operate with over-center, snap action to urge said shutters into the other position when the lever is actuated to move them to the other position.

References Cited in the file of this patent
UNITED STATES PATENTS

| | | |
|---|---|---|
| 1,480,095 | Moller | Jan. 8, 1924 |
| 1,683,211 | Simmons | Sept. 4, 1928 |
| 1,720,451 | Smith | July 9, 1929 |
| 1,756,784 | Johnson | Apr. 29, 1930 |
| 1,862,733 | Wright | June 14, 1932 |
| 2,005,364 | Derringer | June 18, 1935 |
| 2,070,534 | Gough | Feb. 9, 1937 |
| 2,408,263 | Mazzarisi | Sept. 24, 1946 |
| 2,413,447 | Greene | Dec. 31, 1946 |
| 2,449,389 | Krisewetter | Sept. 14, 1948 |
| 2,546,795 | Steckbauer | Mar. 27, 1951 |